United States Patent
Onizuka et al.

[11] Patent Number: 5,397,221
[45] Date of Patent: Mar. 14, 1995

[54] VALVE OPERATING MECHANISM

[75] Inventors: Katsumi Onizuka; Satoshi Matsuno; Kazuo Sasaki, all of Osaka, Japan

[73] Assignee: Yamamoto Suiatu Kogyosho Co., Ltd., Osaka, Japan

[21] Appl. No.: 280,476

[22] Filed: Jul. 26, 1994

Related U.S. Application Data

[62] Division of Ser. No. 9,880, Jan. 27, 1993, abandoned.

[30] Foreign Application Priority Data

Feb. 3, 1992 [JP] Japan .................................. 4-047830

[51] Int. Cl.⁶ ........................ F04B 17/00; F16K 31/12
[52] U.S. Cl. ................... 417/392; 137/596.18; 251/61.1; 251/212
[58] Field of Search .................... 137/885, 596.18; 251/61.1, 212; 417/392

[56] References Cited

U.S. PATENT DOCUMENTS

| 3,937,440 | 2/1976 | MacGregor et al. | 251/61.1 |
| 4,085,942 | 4/1978 | Yoshida et al. | 277/30 |

FOREIGN PATENT DOCUMENTS

| 672023 | 10/1963 | Canada | 251/61.1 |
| 0029396 | 5/1981 | European Pat. Off. | |

Primary Examiner—John C. Fox
Attorney, Agent, or Firm—Darby & Darby

[57] ABSTRACT

A valve operating mechanism which opens and closes a passage communicating to a cavity by contraction and restoration of a packing, with little mechanical movable parts for the opening/closing operation.

1 Claim, 6 Drawing Sheets

VALVE OPERATING MECHANISM

This is a division, of application Ser. No. 08/009,880, filed Jan. 27. 1993, now abandoned.

BACKGROUND OF THE INVENTION

1. Field of the Invention

This invention relates to a valve operating mechanism mainly for a superhigh pressure fluid of several thousands of atmospheres.

2. Description of the Related Art

FIG. 1 is a diagrammatic view of a conventional valve operating mechanism for a superhigh pressure fluid, in which references 41 and 45 represent a valve casing and a valve stem, respectively.

A cavity 42 is formed in the central part of the valve casing 41, and passages 43, 44 are provided for letting fluid flow from the outside of the valve casing 41 into the cavity 42 and for letting the fluid flow from the cavity to the outside of the valve casing 41. A valve-stem 45 is inserted into a hole penetrating from the outside of the valve casing 41 to the cavity 42. A conical front end of the valve stem 45 faces a valve seat 42a formed at an end of the passage 43 opening to the cavity 42. The other end of the valve stem 45 is coupled to a hydraulic cylinder 46.

In the conventional valve operating mechanism in the structure as above, when driving the hydraulic cylinder 46 to retract the valve stem 45 from the valve seat 42a, the pressurized fluid is allowed to pass from the one passage 43 to the other passage 44 as indicated by an arrow. When necessary, the hydraulic cylinder 46 is activated to press and butt the front end of the valve stem 45 against the valve seat 42a thereby to close the passage 43.

Since the front end of the valve stem 45 is pressed to the valve seat with a tremendous power, the butting faces of both the valve seat 42a and valve stem 45 are prone to be abraded or finally be damaged, thus reducing the life of the mechanism. At the same time, laborious check for maintenance or renewal of parts is frequently required.

SUMMARY OF THE INVENTION

This invention has been devised to solve the aforementioned inconveniences and has for its essential object to provide a valve operating mechanism having almost no mechanical movable parts, which causes no deterioration in sealing function subsequent to the abrasion or damage and consequently obtaining a long-service life.

The above and further objects and features of the invention will more fully be apparent from the .following detailed description with accompanying drawings.

DESCRIPTION OF THE PREFERRED EMBODIMENTS

This invention will be depicted hereinafter taken in conjunction with a preferred embodiment thereof with reference to the accompanying drawings.

Figure 1:
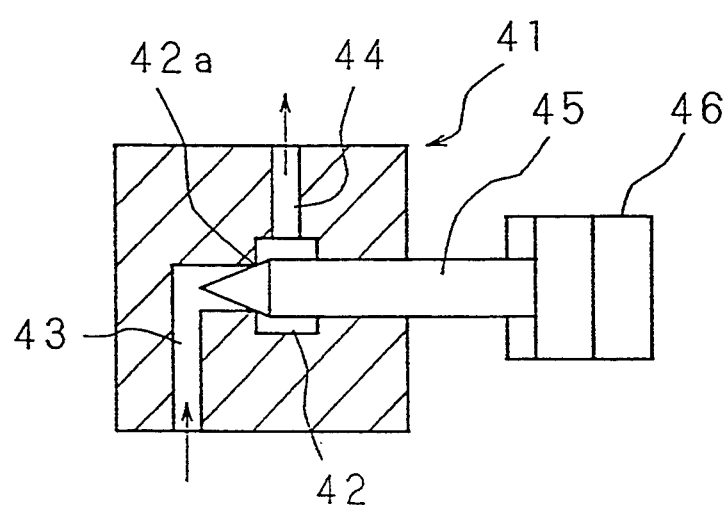
FIG. 1 is a longitudinal cross section of a conventional valve operating mechanism.
Figure 2:
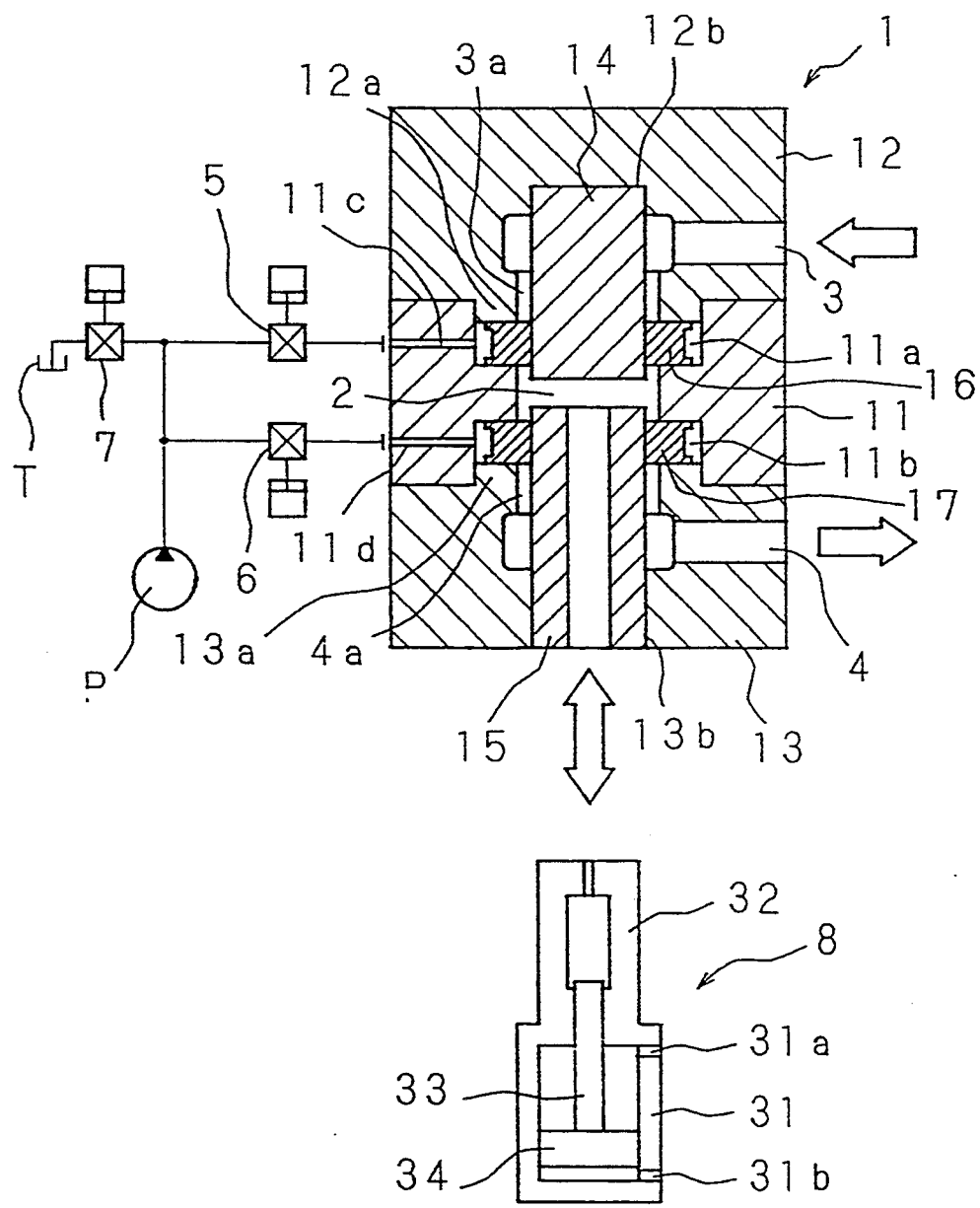
FIG. 2 is a longitudinal cross section indicating the structure of a pressure treatment apparatus employing a valve operating mechanism of this invention.

FIG. 2 is a longitudinal cross section indicating the diagrammatic structure of a pressure treatment apparatus employing a valve operating mechanism of this invention. In FIG. 2, a reference numeral 1 indicates a main body casing of the valve operating mechanism of this invention, and a reference numeral 8 designates a superhigh pressurizing device. The main body casing 1 is constituted of an integral assembly of a main block 11 and an upper and lower block 12, 13, which is resistant to pressures of at least several thousands of atmospheres as a whole.

The main block 11 is formed in the shape of a short cylinder with a thick-wall and a central bore axially penetrating. The bore has larger diameters at the upper and lower ends than in the central part which forms a cavity 2. Fitting portions 12a, 13a formed in the respective upper and lower blocks 12, 13 are fitted to the upper and lower ends of the bore. Moreover, between the fitting portions 12a, 13a and the central part of the bore which forms a cavity are formed annular grooves 11a, 11b.

In the upper and lower blocks 12, 13 formed passages 3, 4 penetrating from the outside of the one block through the cavity 2 and to the outside of the other block in L-shape. The opening ends of the passages 3, 4 towards the outside are respectively coupled to a tank of a treating fluid or a tank of a treated fluid via pipes (not shown). Near the opening ends of the passages 3, 4 towards the cavity 2, a plunger 14 and a cylindrical body 15 are respectively arranged concentrically therewith to form annular passages 3a, 4a around. The ends of the plunger 14 and cylindrical body 15 on the cavity 2 side, project in the cavity 2 beyond the annular grooves 11a, 11b with end faces thereof being spaced at a predetermined distance apart. The upper end of the plunger 14 is fixedly pressed into a recess 12b of the upper block 12. The lower end of the cylindrical body 15 is fixedly pressed into a hole 13b penetrating to the lower face of the lower block 13.

Annular packings 16, 17 for which the patent is already issued (Japanese Patent Publication No. 55-6855 (1980) whose corresponding U.S. Pat. Nos. 4,085,942, 4,149,731, German Patent No. 2,640,221, English Patent No. 1,552,493, Canadian Patent No. 1,053,284, French Patent No. 7,624,663; and Japanese Patent Publication No. 58-17897 (1983)), applied by the applicants of this invention, etc., are interposed in the annular grooves 11a, 11b. Introduction paths 11c, 11d of the pressure is penetrated from the outside of the main block 11 to the annular grooves 11a, 11b.

The introduction paths 11c, 11d are connected to a pump P via auxiliary valves 5, 6 and to a tank T via a discharge valve 7. Accordingly, the highly pressurized water from the pump P is introduced into the annular grooves 11a, 11b by opening/closing the auxiliary valves 5, 6 in order to add the water pressure to the outer periphery of the packings 16, 17 interposed therein. On the contrary, the highly pressurized water in the annular grooves 11a, 11b is discharged to the tank T by opening the discharge valve 7.

Figure 3:
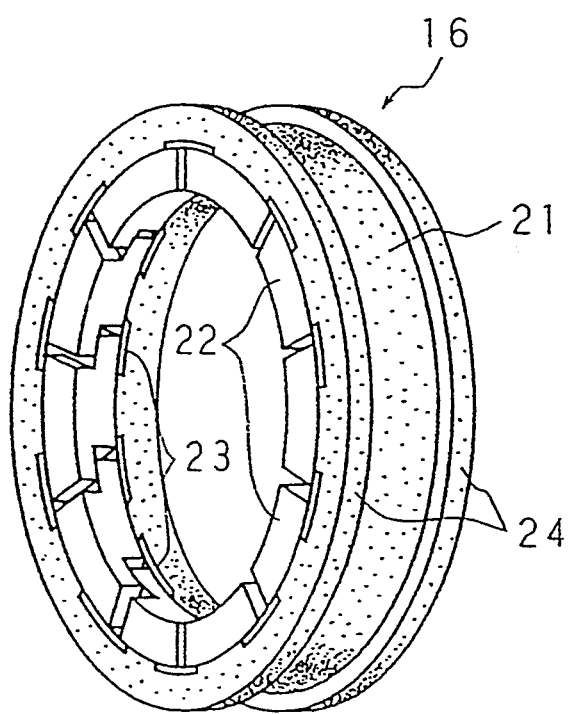
FIG. 3 is an enlarged perspective view of a packing used in the valve operating mechanism of this invention.

Since the packings 16, 17 have substantially the same structures, the following concrete description will be directed to the packing 16 with reference to FIG. 3, 4.

Figure 4A:
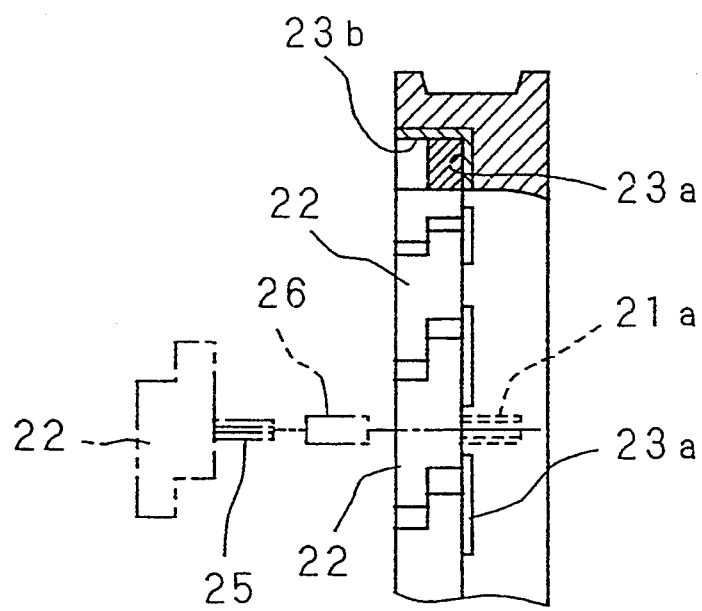
FIGS. 4(a) and 4(b) are partial cross sectional view and a perspective view of the packing of FIG. 3.
Figure 4B:
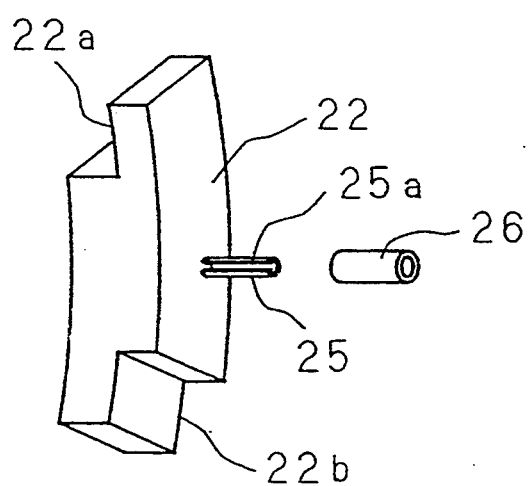

FIG. 3 is an enlarged perspective view of the packing 16, and FIG. 4(a) and 4(b) are respectively a partial cross sectional view and a perspective view of a backup piece of the packing in FIG. 3. The packing 16 comprises an annular main body 21, backup pieces 22, 22, . . . arranged on one side of the inner peripheral surface of the main body 21, and adapter pieces 23, 23, . . . respectively assisting the backup pieces 22, 22, . . . to easily slide. The main body 21 of the packing is made of raw rubber such as polyurethane rubber or the like of high elasticity, which has axially protruding flanges 24, 24 formed at edges in the outer peripheral surface thereof. The middle of the inner peripheral surface of the main body where the backup pieces 22, 22, . . . are installed is steplike. The diameter of the inner peripheral surface of the main body 21 is set larger on the backup pieces 22, 22, . . . installed side than the other side, and the inner surface from the backup piece 22 installed point toward the other side end is tapered to gradually reduce the inner diameter.

Each backup piece 22 is made of metal such as aluminum alloy is curved in arc as shown in FIG. 4(b), and parts 22a, 22b at the both ends in the curving direction are notched in the opposite direction to each other so that a backup piece 22 is fits with the neighboring backup piece in the notched parts 22a, 22b. The backup pieces are installed at required intervals when the packing main body 21 is not compressed.

An elastic pin 25 projects at the rear face of the backup piece 22, that is, the face to be mounted to the packing main body 21. At the same time, mounting holes 21a, 21a, . . . are bored in the stepped inner peripheral surface at a predetermined intervals corresponding to the mounting position of the backup piece 22. A sleeve 26 is fitted in the mounting hole 21a. As the elastic pin 25 of the backup piece 22 is inserted into the sleeve 26, the backup piece 22 is installed to the main body 21.

The elastic pin 28 made of elastic material, for example, spring steels, is formed tubular, having an expanding slot 25a in the axial direction. The sleeve 26 prevents the packing main body 21 from invading the expanding slot 25a of the elastic pin 25 when the packing main body 21 is compressed, thus keeping water-tight force at the position where the packing main body 21 is in touch with the plunger 14 and cylindrical body 15 from being weakened.

The L-shaped adapter piece 23 made of aluminum alloy, etc., is provided between the area where the backup piece 22 is to be fitted with the adjacent backup piece 22, and the packing main body 21. The rear faces of the two adjoining backup pieces 22, 22 are slidably in touch with the leg portion 23a of the adapter piece 23, and the outer surfaces of the two adjoining backup pieces 22, 22 are slidably in touch with the pillar portion 23b of the adapter piece 23.

When the auxiliary valves 5, 6 are opened/closed and the pressurized water generated by the pump P is introduced into the annular grooves 11a, 11b through the introduction paths 11c, 11d, the main bodies 21 of the packings 16, 17 are compressed, and at the same time, the backup pieces 22, 22, . . . slide over the adapter elements 23. In consequence, the distance between the backup pieces 22, 22 is reduced thereby to contract the packing main body 21. As a result, the inner peripheral surface of the packing main body 21 is brought into tight contact with the outer peripheral surfaces of the plunger 14 and cylindrical body 15 to close the annular passages 3a, 4a.

To the contrary, by manipulating the discharge valve 7 to discharge the highly pressurized water in the annular grooves 11a, 11b to the tank T through the introduction paths 11c, 11d, the packing main body 21 restores to the original state by its elasticity. Accordingly, the inner peripheral surface of the packing main body 21 is detached from the outer peripheral surfaces of the plunger 14 and cylindrical body 15 thereby to open the annular passages 3a, 4a.

The superhigh pressurizing device 8 is provided with a hydraulic cylinder 31 and a water-pressure cylinder 32. A rod 33 having a piston 34 at one end is placed in the hydraulic cylinder 31. The other end of the rod 33 protruding from the hydraulic cylinder 31 which works as a ram shifted in the water-pressure cylinder 32.

The front end of the water-pressure cylinder 32 is connected to the opening of the cylindrical body 15 fixedly pressed into the hole 13b of the lower block 13 in the casing 1 so as to add a high pressure of several thousands of atmospheres into the cavity 2 through the cylindrical body 15.

Now, the operation of this apparatus will be discussed with reference to FIG. 2 of the longitudinal cross section and FIGS. 4, 5 which are explanatory diagrams of the operation.

A: SUPPLY OF A TREATING FLUID

Figure 5:
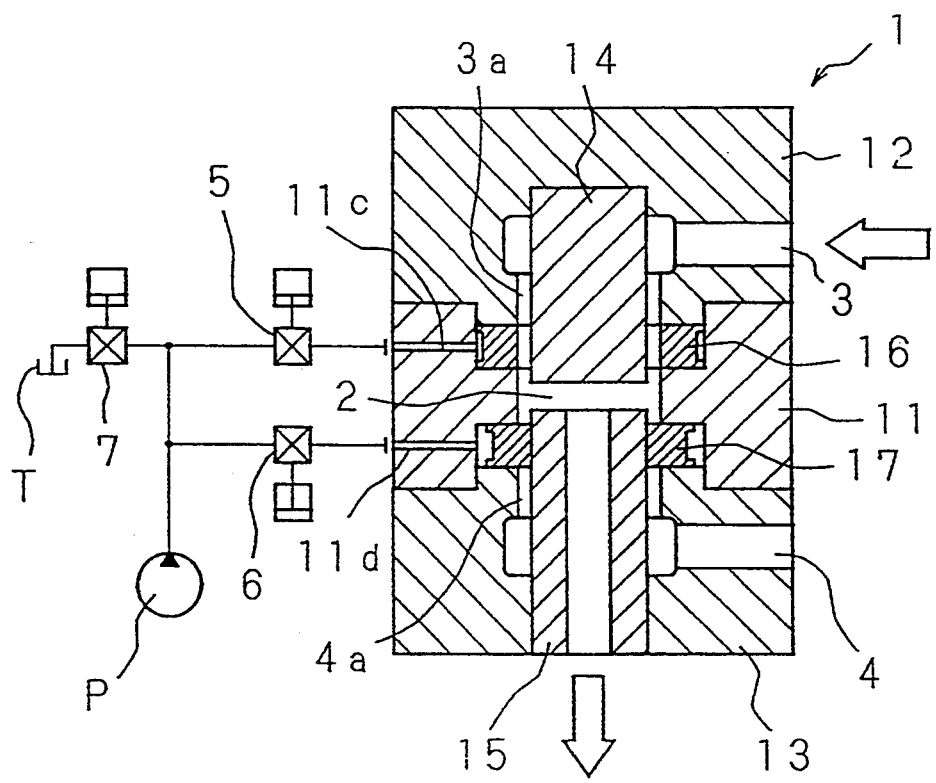
FIG. 5 is a diagram explanatory of the operation in introducing a treating fluid into a cavity.

As shown in FIG. 5, after the highly pressurized water is supplied to the outer periphery of the lower packing 17 to contract the packing 17, thereby to close the lower annular passage 4a, the auxiliary valve 6 is closed. Meanwhile, the auxiliary valve 5 and discharge valve 7 are opened to discharge the highly pressurized water around the outer periphery of the packing 16 to the tank T, thereby to contract the packing 16 to open the upper annular passage 3a.

In the state as above, by supplying water from a port 31a of the superhigh pressurizing device 8 of FIG. 2, and discharging water through the port 31b, the piston 34 is retracted, which causes the rod 33 to move back from within the water-pressure cylinder 32. Because of the negative pressure generated at this time, the treating fluid is introduced into the cavity 2 via the passage 3 and annular passage 3a from a tank (not shown), as indicated by a white arrow in FIG. 5.

When the piston 34 of the superhigh pressurizing device 8 reaches the retracting limit, the pump P is driven to guide the highly pressurized water toward the outer periphery of the upper packing 16 through the introduction path 11c, so that the packing 16 is contracted to close the annular passage 3a. Thus, it is returned to the state of FIG. 2.

B: PRESSURE TREATMENT

In the state shown in FIG. 2, by feeding the highly pressurized water through the port 31b of the superhigh pressurizing device 8 while discharging water through the port 31a, the piston 34 is advanced and the rod 33 is brought inside the water-pressure cylinder 32, thereby generating superhigh pressure. This pressure is added into the cavity 2 through the cylindrical body 15. Accordingly, the treating fluid is pressurized to several thousands of atmospheres to be sterilized. After a predetermined period in the above state, tile pressure by the superhigh pressurizing device 8 is released.

C: DISCHARGE OF A TREATED FLUID

Figure 6:
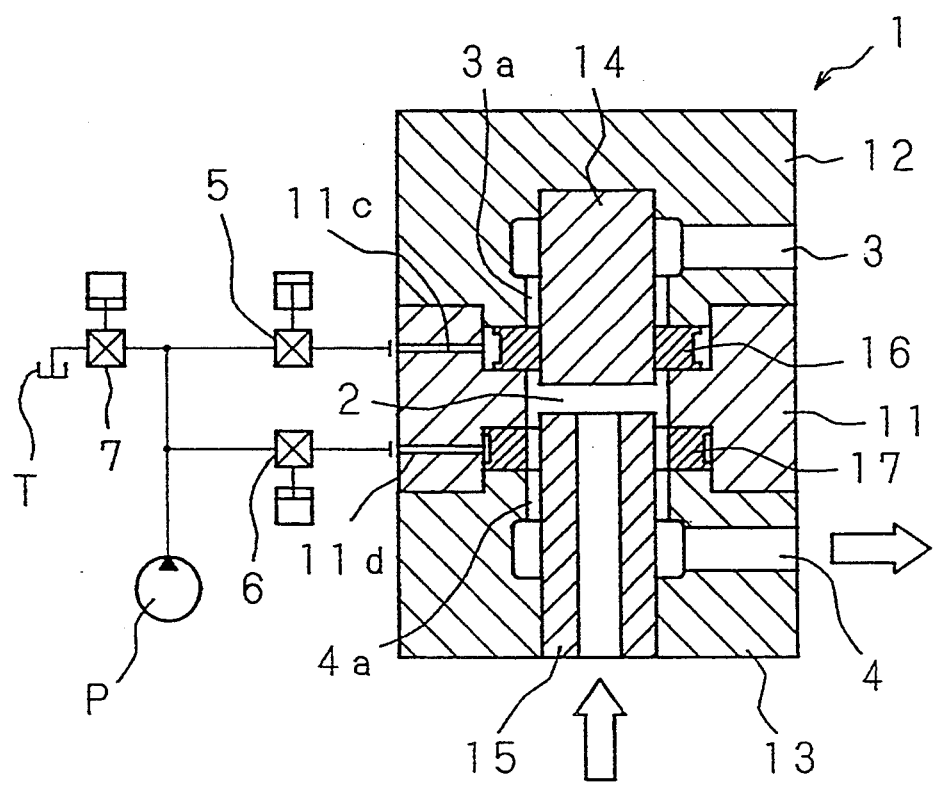
FIG. 6 is a diagram explanatory of the operation in discharging a treated fluid out of the cavity.

The high pressure to the lower packing 17 is removed by opening the auxiliary valve 8 thereby to loosen the packing 17 and open the annular passage 4a. Thus, the apparatus is changed from the state of FIG. 2 to the state of FIG. 6.

Subsequently, the treated fluid in the cavity 2 is sent out to the external tank through the annular passage 4a and passage 4, to the external tank by the residual pressure the superhigh pressurizing device 8.

Although, in the foregoing embodiment, the mechanism of the invention is applied to the pressure treatment apparatus, this invention is not limited to the above application. But it may be so designed, for instance, as to connect the cylindrical body 15 to a general fluid feed pipe, thereby to constitute a valve operating mechanism for selectively letting a fluid introduced into the cavity through the feeding pipe flow through the passages 3, 4 by manipulating the packings 16, 17.

As described hereinbefore, the mechanism of the invention are provided with two passages communicating to the cavity in the main body casing, which are annular at least at a part, and with a packing in the annular passage to open/close the annular passage by its contraction and restoration owing to pressure added or removed. Accordingly, when a treating fluid is guided into the cavity from one passage and pressurized and further discharged outside, a sequence of operations therefor can be carried out without using mechanically movable parts, whereby the abrasion of parts due to the friction, etc., is avoided and the life of the apparatus is elongated remarkably.

As this invention may be embodied in several forms without departing from the spirit of essential characteristics thereof, the present embodiment is therefore illustrative and not restrictive. The scope of the invention is defined by the appended claims rather than by the description preceding them, and all changes that fall within metes and bounds of the claims or equivalence of such metes and bounds thereof are therefore intended to be embraced by the claims.

What is claimed is:

1. A valve and operating mechanism therefor comprising:

a main body casing having a cavity therein;

first and second ports extending through said main body casing for respectively admitting fluid to and discharging fluid from said main body;

means forming a respective first and second annular passage at the ends of said cavity for providing communication between said cavity and a respective one of said first and second ports;

a pressure responsive annular packing at each of said annular passages to open and close the passage upon application and removal of pressure to effect expansion and contraction of said packing;

means for adding pressure to said cavity; and means for selectively applying pressure to said annular packings to:

a) open the first passage between said first port and said cavity and close the second passage between said second port and said cavity to admit fluid into said cavity, b) to close said first and second passages to contain fluid in said cavity for application of pressure from said pressure adding means to the fluid contained in the cavity, and c) closing said first passage and opening said second passage to permit the pressure treated fluid to exit from said cavity through said second port.

* * * * *